(12) United States Patent
Robinet et al.

(10) Patent No.: US 9,751,383 B2
(45) Date of Patent: Sep. 5, 2017

(54) WATERTIGHT VEHICLE AIRDUCT SYSTEM

(71) Applicants: Kevin J Robinet, West Bloomfield, MI (US); Paul Netkowski, Gaines, MI (US); Randy P Haas, Clarkston, MI (US)

(72) Inventors: Kevin J Robinet, West Bloomfield, MI (US); Paul Netkowski, Gaines, MI (US); Randy P Haas, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 355 days.

(21) Appl. No.: 14/676,019

(22) Filed: Apr. 1, 2015

(65) Prior Publication Data

US 2015/0202944 A1    Jul. 23, 2015

Related U.S. Application Data

(62) Division of application No. 11/773,817, filed on Jul. 5, 2007, now abandoned.

(51) Int. Cl.
| | |
|---|---|
| *B60H 1/26* | (2006.01) |
| *B60H 1/24* | (2006.01) |
| *B60H 1/00* | (2006.01) |
| *H01M 10/625* | (2014.01) |
| *H01M 10/6563* | (2014.01) |

(52) U.S. Cl.
CPC ........... *B60H 1/26* (2013.01); *B60H 1/00278* (2013.01); *B60H 1/246* (2013.01); *B60H 1/249* (2013.01); *B60H 2001/003* (2013.01); *H01M 10/625* (2015.04); *H01M 10/6563* (2015.04)

(58) Field of Classification Search
CPC .......... B60H 1/26; B60H 1/248; B60H 1/246; B60H 1/24
USPC ............................................ 454/162, 115, 69
See application file for complete search history.

(56) References Cited

U.S. PATENT DOCUMENTS

| | | | |
|---|---|---|---|
| 4,144,803 A | 3/1979 | Gotz et al. | |
| 5,081,912 A | 1/1992 | Clenet | |
| 6,068,551 A | 5/2000 | Oremland | |
| 6,318,397 B1 | 11/2001 | Huber et al. | |
| 6,662,891 B2 | 12/2003 | Misu et al. | |
| 6,857,955 B1 * | 2/2005 | Held ..................... | B60H 1/246 454/143 |

(Continued)

FOREIGN PATENT DOCUMENTS

| | | |
|---|---|---|
| DE | 20306051 U1 | 7/2003 |
| JP | 60042116 | 3/1985 |
| JP | H07237457 A | 9/1995 |

(Continued)

*Primary Examiner* — Steven B McAllister
*Assistant Examiner* — Ko-Wei Lin
(74) *Attorney, Agent, or Firm* — Ralph E Smith

(57) ABSTRACT

A duct for a vehicle includes an inlet fluidly coupled to an interior of the vehicle and an outlet fluidly coupled to the inlet. A buoyant closure member is disposed between the inlet and the outlet and is movable between an open position permitting flow between the inlet and the outlet and a closed position preventing flow between the inlet and the outlet. The buoyant closure member is normally in the open position and is movable from the open position to the closed position in response to a predetermined volume of water entering the outlet.

6 Claims, 7 Drawing Sheets

(56) References Cited

U.S. PATENT DOCUMENTS

| | | | | |
|---|---|---|---|---|
| 7,419,209 B1 * | 9/2008 | Mangiapane | ...... | B60H 1/00278 |
| | | | | 180/65.1 |
| 2007/0205623 A1 * | 9/2007 | Hung | ................ | B60H 1/00564 |
| | | | | 296/24.34 |

FOREIGN PATENT DOCUMENTS

| JP | 2001233064 A | 8/2001 |
|---|---|---|
| JP | 2004243855 A | 9/2004 |
| JP | 2005155439 A | 6/2005 |
| JP | 05193376 B1 | 5/2013 |

* cited by examiner

WATERTIGHT VEHICLE AIRDUCT SYSTEM

CROSS-REFERENCE TO RELATED APPLICATIONS

This application is a divisional of U.S. patent application Ser. No. 11/773,817 filed on Jul. 5, 2007. The entire disclosure of the above application is incorporated herein by reference.

FIELD

The present invention relates to a venting system for a vehicle and, more particularly, to a submergible venting system for a vehicle.

BACKGROUND

Conventional vehicles typically include at least one body exhauster to permit airflow from within a passenger compartment of a vehicle to an area generally outside of the vehicle. Such body exhausters allow a heating, ventilation, and air conditioning (HVAC) unit to draw in, condition, and circulate air within a vehicle while permitting air disposed within the passenger compartment of the vehicle to be exhausted through the body exhauster to maintain the passenger compartment at a predetermined pressure. Such body exhausters allow one-way communication between the passenger compartment and an area outside of the vehicle such that air is permitted to exit the vehicle while debris and outside air is restricted from entering the vehicle. While conventional body exhausters adequately vent a passenger compartment of a vehicle while concurrently preventing debris and outside air from entering the passenger compartment of the vehicle, conventional body exhausters cannot typically be located near or on a lower surface of a vehicle, as conventional body exhausters cannot prevent entry of water into the vehicle should a lower portion of the vehicle become submerged in water.

SUMMARY

A duct for a vehicle includes an inlet fluidly coupled to an interior of the vehicle and an outlet fluidly coupled to the inlet. A buoyant closure member is disposed between the inlet and the outlet and is movable between an open position permitting flow between the inlet and the outlet and a closed position preventing flow between the inlet and the outlet. The buoyant closure member is normally in the open position and is movable from the open position to the closed position in response to a predetermined volume of water entering the outlet.

A vehicle includes a floor pan defining at least one cavity with a heat exchanger being disposed within the at least one cavity. A passageway directs air through the heat exchanger and toward a wall of the at least one cavity. A duct is fixedly attached to the wall of the at least one cavity and includes a closure member movable between an open position permitting air received from the heat exchanger to exit the at least one cavity and a closed position preventing fluid from entering the at least one cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its application, or uses.

With reference to the figures, a duct assembly 10 is provided for a vehicle 12. The duct assembly 10 permits communication of air from within an interior of the vehicle 12 to an exterior of the vehicle 12 while concurrently restricting air from traveling through the duct assembly 10 and into the interior of the vehicle 12. The duct assembly 10 also restricts fluid such as, for example, water, from entering the interior of the vehicle 12 should the vehicle 12 be submerged in a predetermined volume of water.

Figure 1:
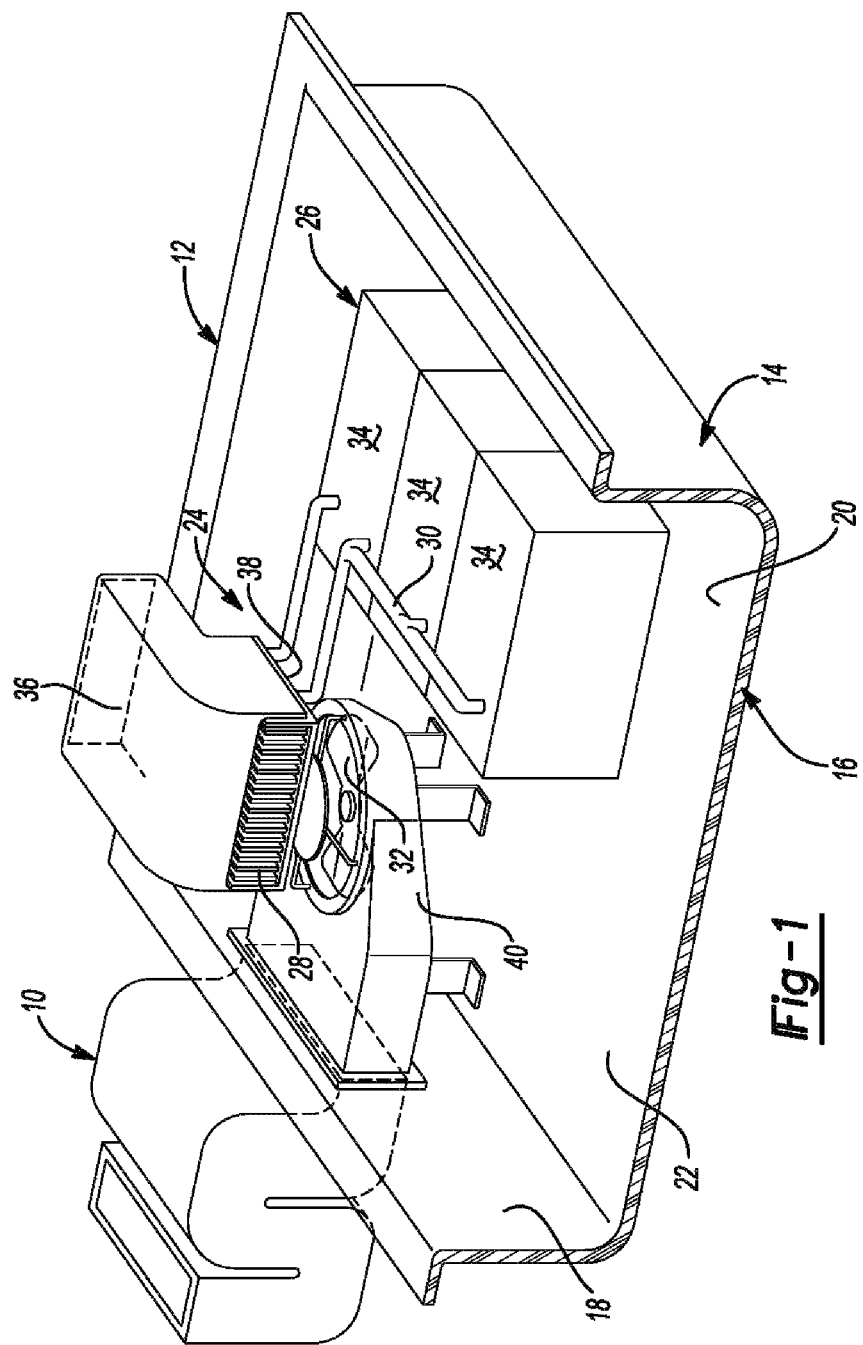
FIG. 1 is a perspective view of a portion of a vehicle incorporating a thermal-management system, an energy system, and a submergible duct in accordance with the present teachings.

The duct assembly 10 may extend through a body panel 14 of the vehicle 12 such as a floor pan 16. As shown in FIG. 1, the duct assembly 10 may extend through a side wall 18 of a well 20 formed in the floor pan 16 of the vehicle 12. Because the well 20 is formed in the floor pan 16 of the vehicle 12, the well 20 extends generally towards a driving surface (i.e., a road, etc.). The duct assembly 10 permits communication between an interior volume 22 of the well 20 and an exterior of the vehicle 12. While the duct assembly 10 permits communication from the interior volume 22 of the well 20 to the exterior of the vehicle 12, the duct assembly 10 restricts communication from an area outside the vehicle 12 to the interior volume 22 of the well 20. Such communication from the interior volume 22 of the well 20 permits air from within an interior of the vehicle 12 to be exhausted to an air outside of the vehicle 12 through the duct assembly 10.

Exhausting air from the interior volume 22 of the well 20 may be required if a thermal-management system 24 is disposed within the well 20. For example, thermal-management system 24 may be used to cool an energy system 26 that provides power to the vehicle 12 to propel the vehicle 12 and/or to provide power to subsystems of the vehicle 12.

If an energy system 26 is disposed within the well 20, heat generated by operation of the energy system 26 must be removed from the well 20 by the thermal-management system 24. The thermal-management system 24 may include a heat exchanger 28, a series of conduits 30, and a fan 32 that cooperate to cool a series of batteries 34 of the energy system 26 to remove such heat.

The heat exchanger 28 may be disposed within an inlet duct 36 and may include a refrigerant disposed therein for cooling the batteries 34. A compressor not shown may impart a force on the refrigerant disposed within the heat exchanger 28 to circulate the refrigerant between the heat exchanger 28 and the batteries 34 via conduits 30. Circulation of refrigerant between the heat exchanger and the batteries 34 will permit heat from the batteries 34 to be absorbed by the refrigerant disposed within the conduits 30 and be transferred to the heat exchanger 28. The heat absorbed by the refrigerant will be rejected at the heat exchanger 28 and may be transferred to air drawn into the well 20 by the fan 32 via the inlet duct 36.

The fan 32 may impart a fluid force on an outlet 38 of the inlet duct 36 to draw air through the heat exchanger 28. Drawing air through the heat exchanger 28 will cause the heat rejected by the refrigerant via the heat exchanger 28 to be drawn through the heat exchanger 28 and generally into an outlet duct 40. The heated air drawn through the heat exchanger 28 and into the outlet duct 40 may be expelled from an interior of the vehicle 12 through the duct assembly 10. The force exerted on the air flowing through the heat exchanger 12 will cause the heated air flow to travel along the outlet duct 40 and pass through the side wall 18 of the floor pan 16 to allow the heated air to escape the interior volume 22 of the well 20 and be exhausted into an area outside of the vehicle 12. Because the well 20 extends generally towards a surface over which the vehicle 12 may travel, the heated air received through the heat exchanger 28 and from the outlet duct 40 will be expelled generally in an area between a bottom of the floor pan 16 and the surface over which the vehicle 12 is traveling. Positioning the duct assembly 10 in a location generally on a bottom surface of the floor pan 16 to permit communication of heated air through the side wall 18 of the well 20 adequately vents the heated air into an area exterior of the vehicle 12. However, positioning the duct assembly 10 on a bottom surface of the vehicle 12 exposes the duct assembly 10 to debris as well as environmental conditions such as rain, snow, and ice.

As indicated above, the duct assembly 10 permits air to flow from an interior of the vehicle 12 to an exterior of the vehicle 12 and concurrently prevents air flow from entering the interior of the vehicle 12 through the duct assembly 10. The duct assembly 10 also restricts flow of water and other debris into the interior of the vehicle 12 when the vehicle 12 is either driven through wet conditions (i.e., rain, snow, etc.) or when the vehicle 12 is submerged in water such that a bottom surface of the floor pan 16 is in contact with or under water.

Figure 2:
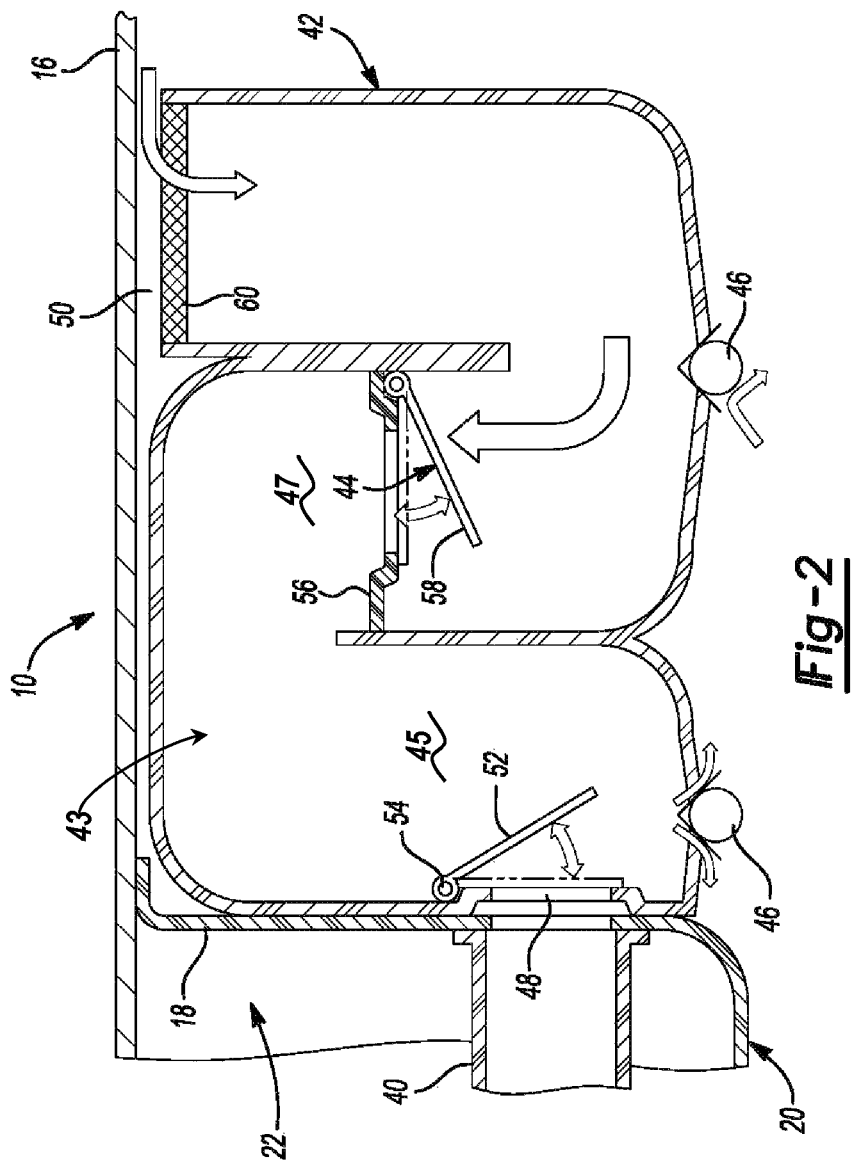
FIG. 2 is a cross-sectional view of the submergible duct in accordance with the principles of the present teachings incorporating a floating door.

With reference to FIG. 2, the duct assembly 10 is shown to include a housing 42, a closure member 44 disposed within the housing 42, and a pair of check valves 46 supported by the housing 42. The housing 42 may include a torturous path 43 extending between an inlet 48 and an outlet 50, whereby the inlet 48 is fluidly coupled to the outlet duct 40 and receives air from the outlet duct 40. As can be seen in for example FIG. 2, the tortuous path 43 includes an upwardly extending portion 45 and a downwardly extending portion 47 with downwardly extending portion 47 disposed between the upwardly extending portion 45 and the outlet 50. A door 52 may be disposed proximate to the inlet 48 to permit flow from the outlet duct 40 through the inlet 48 and to restrict flow from passing through the housing 42 and into the outlet duct 40. In one configuration, the door 52 is hingedly supported by the housing 42 by a pivot 54. The pivot 54 permits the door 52 to rotate in a clockwise direction relative to the view shown in FIG. 2 to permit air to flow out of the outlet duct 40 and into the housing 42, as shown in FIG. 2.

While the pivot 54 permits the door 52 to rotate in a clockwise direction relative to the view shown in FIG. 2 to allow the door 52 to return from an open position (FIG. 2) to a closed position, the door 52 is restricted from pivoting into the inlet 48, as the door 52 includes a sufficient length and width to fully cover the inlet 48 of the housing 42. Therefore, when air travels into the outlet 50 of the housing 42 and engages the door 52, the force exerted on the door 52 causes the door 52 to move into the closed position and seal the inlet 48. Sealing the inlet 48 prevents fluid such as air and/or water from entering the housing 42 at the outlet 52 from entering the outlet duct 40 via the inlet 48 of the housing 42. In essence, the door 52 serves as a check valve permitting flow from the outlet duct 40 into the housing 42 and restricting flow from the housing 42 into the outlet duct 40 via the inlet 48 of the housing 42.

The closure member 44 is disposed within the housing 42 generally between the inlet 48 and the outlet 50 and may include a support member 56 and a door 58. Illustratively as can be seen for example in FIG. 2, the closure member 44 is disposed in the downwardly extending portion 47 of tortuous path 43. The door 58 may be rotatively supported by the support member 56 and may be formed from a buoyant material, such as, for example, foam, santoprene or various polymers (i.e., nylon) molded with an encapsulated air pocket. The door 58 may be rotatably supported by the support member 56 between an open position (FIG. 2) and a closed position.

The door 58 may be positioned proximate to a bottom surface of the support member 56 such that gravity maintains the door 58 in the open position to allow fluid received at the inlet 48 of the housing 42 to travel through the housing 42 and towards the outlet 50. The door 58 is maintained in the open position until the housing 42 of the duct assembly 10 is submerged in a predetermined volume of water, as will be described below.

When the duct assembly 10 is submerged in a predetermined volume of water, water may enter the housing 42 at the outlet 50 and begin to fill the housing 42. When a sufficient volume of water enters the housing 42, the water will rise and engage the door 58, thereby causing the door 58 to rotate in a clockwise direction relative to the view shown in FIG. 2 from the open position to the closed position. Rotation of the door 58 from the open position to the closed position is caused by the buoyant nature of the door material floating on the rising water disposed within the housing 42. When the volume of water reaches a predetermined height within the housing 42, the door 58 is rotated sufficiently in the clockwise direction relative to view shown in FIG. 2 such that the door 58 engages the support member 56 to prevent water from traveling through the support member 56 and reaching the inlet 48 of the housing 42.

While the door 58 cooperates with the support member 56 to prevent water from traveling through the support member 56 and reaching the door 52 proximate to the inlet 48 of the housing 42, some water may travel through the support member 56 and be received within the housing 42 proximate to the door 52. Such water may splash through the support member 56, as the water rises within the housing 42 prior to the door 58 being moved into the fully closed position. Furthermore, such water may travel through the support member 56 when the duct assembly 10 is not fully submerged in water, but when the vehicle 12 is driven through wet conditions (i.e., rain, snow, etc.).

While the volume of water entering the housing 42 and passing through the support member 56 may not be sufficient to flow through the inlet 48 of the housing 42 and into the outlet duct 40, if the water is permitted to collect generally at the bottom of the housing 42, such water may become stagnant and, over time, begin to emit a foul odor. To prevent water from collecting at a bottom of the housing 42, the check valves 46 are disposed at low points of the housing 42 (i.e. at a bottom of a P-trap, for example) to allow any water that collects within the housing 42 to drain from the housing 42. The check valves 46 permit flow from within the housing 42 but restrict flow of water into the housing 42. As can be appreciated, if the check valves 46 were simply apertures formed through a bottom surface of the housing 42, water would both drain from the housing 42 and could also enter the housing 42 via such apertures. Therefore, using check valves 46 allows water to escape the housing 42 while concurrently preventing water from entering the housing 42.

The housing 42 may also include a debris shield 60 disposed along a path of the housing 42. The debris shield 60 may extend across the outlet 50 of the housing 42 or may be positioned at any location along a length of the housing 42 generally between the outlet 50 and the door 58 to prevent debris from reaching the door 58. The debris screen 60 may permit water and air to pass therethrough but will prevent large objects such as, for example, rocks, from entering the housing 42 and damaging the door 58. Preventing such debris from entering the duct assembly 10 not only maintains the integrity of the door 58, but prevents such objects from rattling within the housing 42 and creating undesirable noise.

Positioning the outlet 50 such that the outlet 50 opposes the floor pan 16, allows air to easily escape the outlet 50 while concurrently reducing the likelihood of water from splashing into the housing 42 via the outlet 50. Furthermore, positioning the outlet 50 in such a fashion also helps prevent noise from entering the housing 42 and creating an undesirable condition. While some noise will enter the housing 42 regardless of the position of the outlet 50, positioning the outlet 50 proximate to a bottom surface of the floor pan 16 helps reduce the amount of noise that enters the housing 42 such noise may be mitigated by the tortuous path defined by the shape of the housing 42 and is prevented from reaching the interior volume 22 of the well 20.

Figure 3:
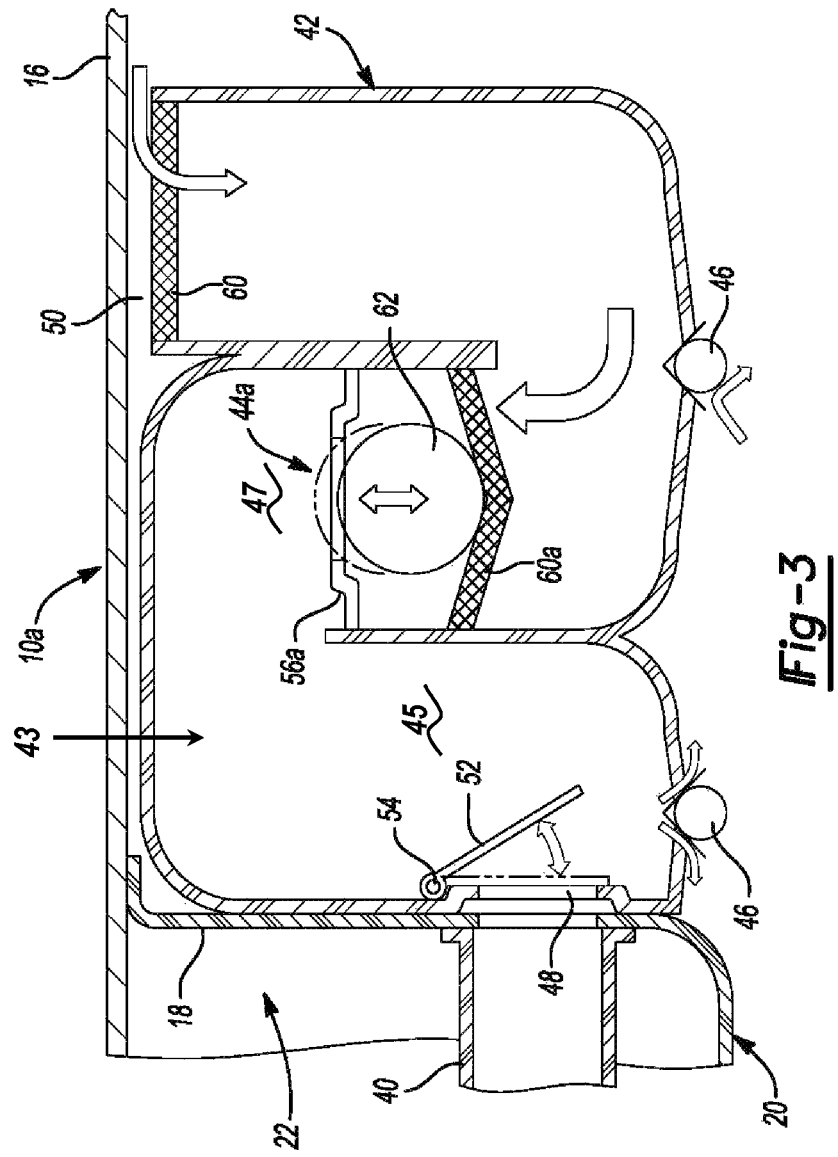
FIG. 3 is a cross-sectional view of a submergible duct in accordance with the principles of the present teachings incorporating a ball float.

With reference to FIG. 3, a duct assembly 10a is provided. In view of the substantial similarity in structure and function of the components associated with the duct assembly 10 with respect to the duct assembly 10a, like reference numerals are used hereinafter in the drawings to identify like components while like reference numerals containing letter extensions are used to identify those components that have been modified.

The duct assembly 10a includes a housing 42, a closure member 44a, and check valves 46. The closure member 44a is disposed generally between an inlet 48 and an outlet 50 of the housing 42 and may include a support member 56a and a ball stop 62. The ball stop 62 selectively engages the support member 56a to prevent communication between the outlet 50 and the inlet 48 of the housing 42 when the duct assembly 10a is submerged in a predetermine volume of water. The ball stop 62 is moveable between an open position (FIG. 3) and a closed position and may be supported by a debris shield 60a having a generally "V" shape when in the open position.

During operation, air may be received through the inlet 48 of the housing 42 from the outlet duct 40 and may travel through the housing 42 towards the outlet 50. Air from the outlet duct 40 is permitted to flow through the support member 56a when the ball stop 62 is in the open position. The air flows generally around the ball stop 62 towards the outlet 50 and exits the housing 42 at the outlet 50.

Should air be received at the outlet 50 of the housing 42, the air is permitted to flow around the ball stop 62, when the ball stop 62 is in the open position. Air flowing around the ball stop 62 is prevented from reaching the outlet duct 40 by the door 52 disposed proximate to the inlet 48 of the housing 42.

When the duct assembly 10a is submerged in a predetermined volume of water, water may fill the housing 42 at the outlet 50. Once a sufficient volume of water enters the housing 42, the water will impart a force on the ball stop 62 and cause the ball stop 62 to move away from the debris shield 60a and toward the support member 56. Sufficient movement of the ball stop 62 away from the debris shield 60a causes the ball stop 62 to engage the support member 56a and prevent water from passing through the support member 56 and reaching the inlet 48 of the housing 42. Movement of the ball stop 62 away from the support member 56a is facilitated by formation of the ball stop 62 from a buoyant material, as described above with regard to the closure member 44 of the duct assembly 10. As with the duct assembly 10, any residual water remaining in the housing 42 may escape the housing 42 via the check valves 46.

Figure 4:
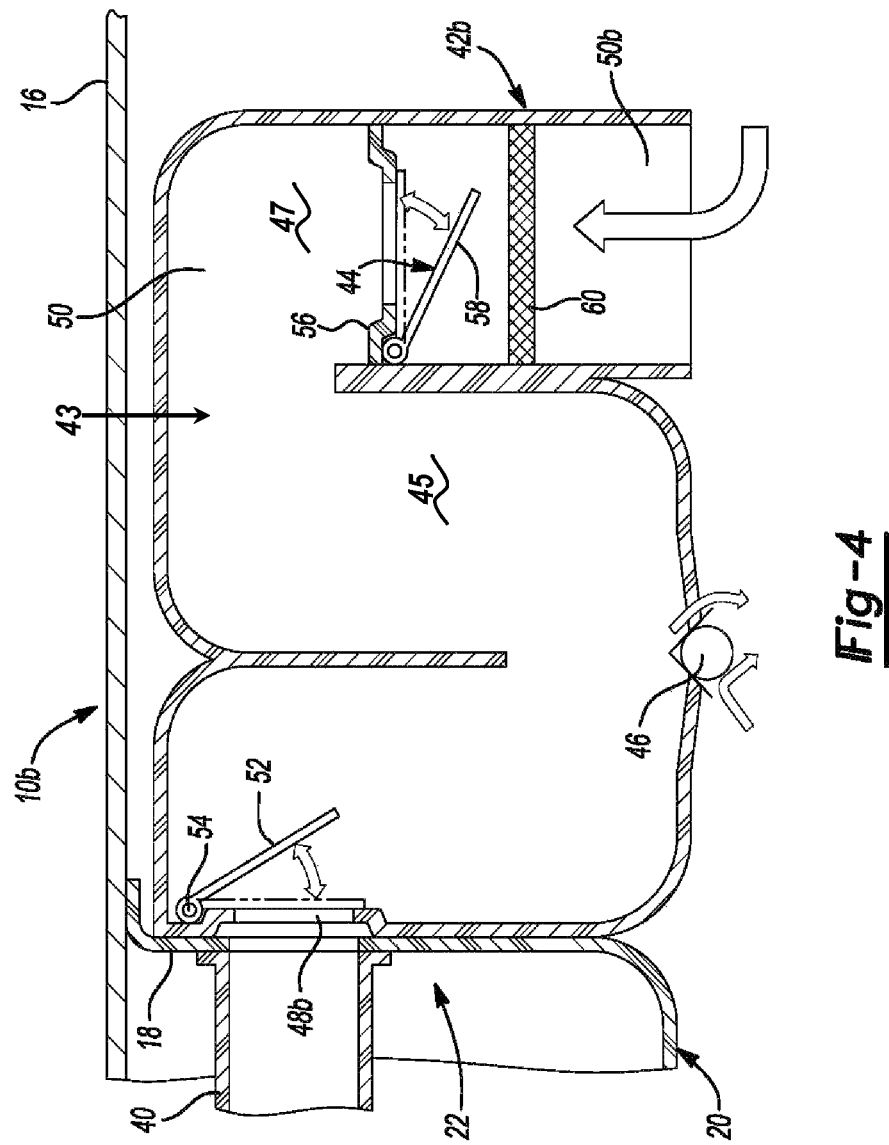
FIG. 4 is a cross-sectional view of a submergible duct in accordance with the principles of the present teachings incorporating a floating door.

With particular reference to FIG. 4, a duct assembly 10b is provided. In view of the substantial similarity in structure and function of the components associated with the duct assembly 10 with respect to the duct assembly 10b, like reference numerals are used hereinafter and in the drawings to identify like components while like reference numerals containing letter extensions are used to identify those components that have been modified.

The duct assembly 10b includes a housing 42b, a closure member 44, and a check valve 46. The housing 42b includes an inlet 48b fluidly coupled to an outlet duct 40 and an outlet 50b facing away from a bottom surface of the floor pan 16 of the vehicle 12. The closure member 44 includes a support member 56 and a door 58 hingedly supported proximate to the support member 56 between an open position and a closed position. The door 58 is biased into the open position under the force of gravity and may be moved into the closed position by a force applied to the door 58 when the duct assembly 10b is submerged in a predetermined volume of water. Movement of the door 58 into the closed position from the open position is facilitated by forming the door 58 from a buoyant material, as described above with regard to the duct assembly 10.

In operation, air is permitted to flow through the outlet duct 40 and into the housing 42b via the inlet 48b. Air flows through the housing 42b and may escape the housing 42b by flowing through the support member 56 of the closure member 44 and finally through the outlet 50b of the housing 42b. Air is restricted from flowing into the outlet duct 40 by the door 52 as described above with respect to the duct assembly 10.

When the duct assembly 10b is submerged in water, water flows into the outlet 50b and applies a force to door 58, thereby, causing the door 58 to rotate in a counterclockwise direction relative to the view shown in FIG. 4. Sufficient rotation of the door 58 in the counterclockwise direction relative to the view shown in FIG. 4 causes the door 58 to move into the closed position to prevent the water from further migrating into the housing 42b. Cooperation between the support member 56 and door 58 prevents the water from filling the housing 42b and therefore prevents the water from entering the outlet duct 40.

As described above with regard to the duct assembly 10, the check valve 46 may be positioned in a P-trap of the housing 42b (i.e., a low point of the housing 42b) to permit water that has collected in the housing 42b to escape the housing 42b while concurrently preventing water from entering the housing 42b via the check valve 46.

As shown in FIG. 4, the inlet 48b is shown generally proximate to an upper portion of the housing 42b. Positioning the inlet 48b proximate to an upper portion of the housing 42b further reduces the likelihood of water entering the outlet duct 40. As can be appreciated, positioning the inlet 48b proximate to an upper portion of the housing 42b requires a greater volume of water to enter the housing 42b before reaching the inlet 48b and, thus, the outlet duct 40b. Positioning the inlet 48b of the housing 42b in such a manner further safeguards against water reaching the outlet duct 40 should the duct assembly 10b be submerged in water.

Figure 5:
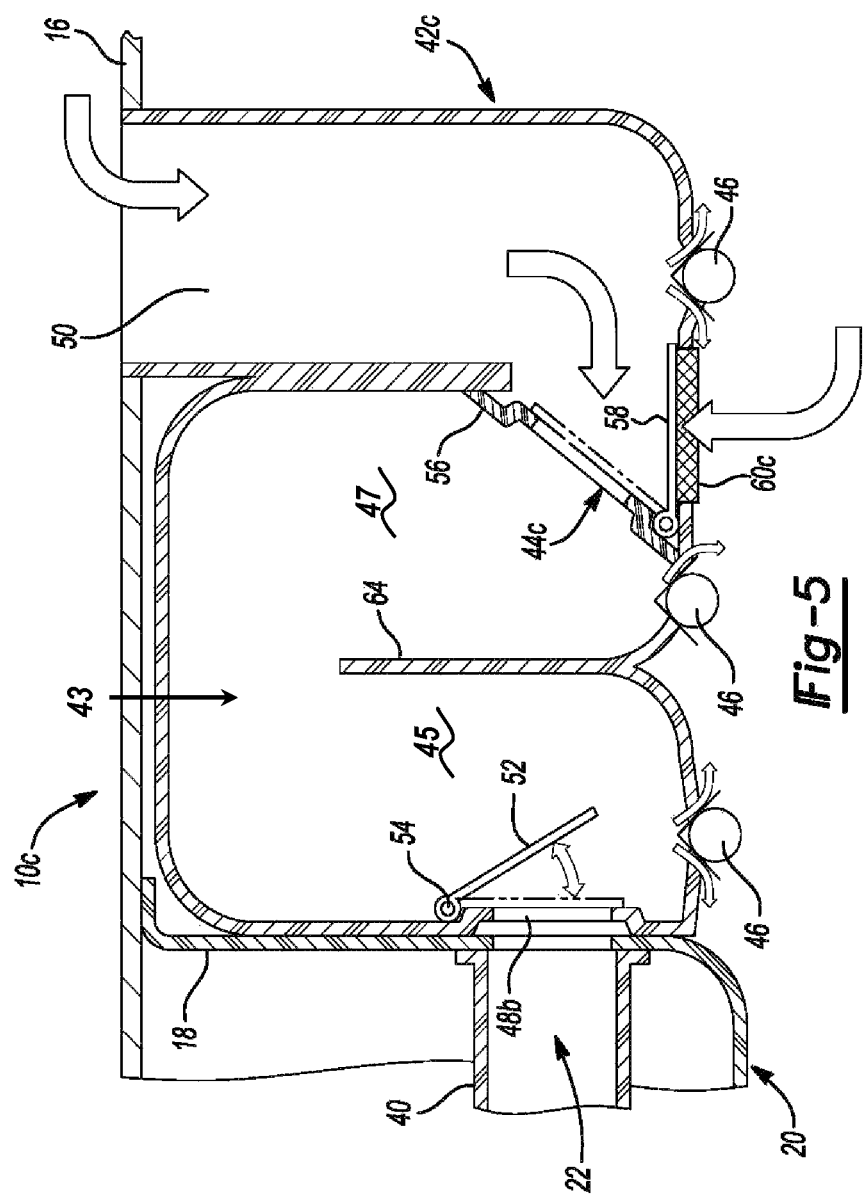
FIG. 5 is a cross-sectional view of a submergible duct in accordance with the principles of the present teachings incorporating a floating door disposed on a bottom surface thereof.

With reference to FIG. 5, a duct assembly 10c is provided. In view of the substantial similarity in structure and function of the components associated with the duct assembly 10 with respect to the duct assembly 10c, like reference numerals are used hereinafter and in the drawings to identify like components while like reference numerals containing letter extensions are used to identified those components that have been modified.

The duct assembly 10c includes the housing 42c, a closure member 44c, and a series of check valves 46. The closure member 44c is disposed generally between an inlet 48 of the housing 42c and an outlet 50 of the housing 42c. The closure member 44 includes a support member 56 and a door 58 hingedly supported proximate to the support member 56 between an open position and a closed position. The door 58 is biased into the open position under the force of gravity and engages the housing 42c when in the open position. In this position, the door 58 permits flow from the inlet 48 to the outlet 50 and permits flow from the outlet 50 to the inlet 48. As with the duct assembly 10, air is restricted from entering the outlet duct 40 due to engagement between the door 52 and the inlet 48.

When the duct assembly 10c is submerged in a predetermined volume of water, water first contacts a bottom surface of the housing 42c and passes through a debris shield 60c disposed between a pair of check values 46. When the water initially passes through the debris shield 60c, the water encounters the door 58 and applies a force on a door 58. Because the door 58 is formed from a buoyant material, as described above with regard to duct assembly 10, the door 58 rotates in the counterclockwise direction relative to the view shown in FIG. 5. Sufficient rotation of the door 58 in the counterclockwise direction relative to the view shown in FIG. 5 causes the door 58 to engage the support member 56 and move into the closed position. When the door 58 is in the closed position, the door 58 abuts the support member 56 and prevents the water entering the housing 42c from passing through the support member 56 and therefore prevents the water from reaching the inlet 48 of the housing 42c.

Should water pass through the door 58, a pair of check valves 46 are disclosed within the housing 42c upstream of the support member 56 to allow the water to drain from the housing 42c prior to the water reaching the inlet 48. In addition, an interior wall 64 of the housing 42c is positioned generally between the support member 56 and the inlet 48. The overall height of the interior wall 64 would require a sufficient amount of water to fill the housing 42 prior to allowing the wall to spill over and engage the inlet 48. Water is prevented from reaching such a volume due to the check valve 46 disposed at a base of the wall 64 generally proximate to the support member 56.

Figure 6:
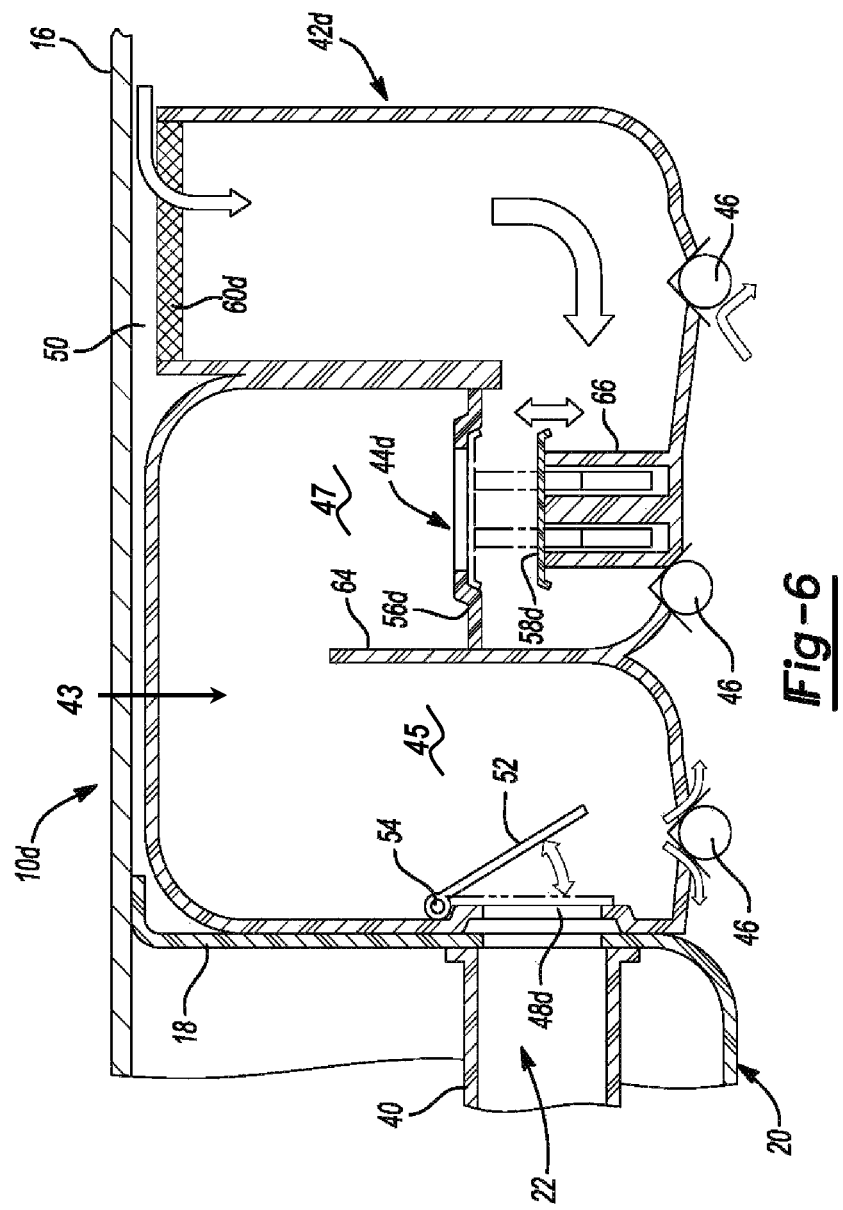
FIG. 6 is a cross-sectional view of a submergible duct in accordance with the principles of the present teachings incorporating a floating door.

With reference to FIG. 6, a duct assembly 10d is provided. In view of the substantial similarity and structure and function of the components associate with the duct assembly 10 with respect to the duct assembly 10d, like reference numerals are used hereinafter and in the drawings to identify like components while like reference numerals containing letter extensions are used to identify those components that have been modified.

The duct assembly 10d includes a housing 42d, a closure member 44d, and a series of check valves 46. The housing includes an inlet 48 and an outlet 50 with the closure member 44d being disposed generally between the inlet 48 and the outlet 50.

The closure member 44 includes a support member 56d and a door 58d moveable relative to the support member between an open position and a closed position. The door 58d is slideably supported by a post 66 that may be integrally formed with the housing 42d. As with the duct assembly 10, the door 58d is formed from a buoyant material to allow water entering the housing 42d to impart a force on and move the door 58d towards the support member 56d to seal off the housing 42d and prevent further entry of water into the housing 42d.

In operation, air flow from the outlet duct 40 is received at the inlet 48 of the housing 42d and is permitted to travel into the housing 42d through the inlet 48 and door 52. The air flow is permitted to travel through the support member 56d and out of the housing 42d via the outlet 50. Air is also permitted to enter the housing 42d at the outlet 50 and travel though the support member 56d generally towards the inlet 48 of the housing 42d. While the air is permitted to flow towards the inlet 48, air is restricted from reaching the outlet duct 40 due to engagement between the door 52 and the inlet 48 of the housing 42d, as previously discussed with regard to the duct assembly 10.

When the duct assembly 10d is submerged in a predetermined volume of water, water enters the housing generally at the outlet 50 of the housing 42d. When a sufficient volume of water enters the housing 42d, the water imparts a force on the door 58d, thereby causing the door 58d to float and move away from the post 66 generally towards the support member 56d.

When the volume of water entering the housing 42d is sufficient to cause the door 58d to engage the support member 56d, water is prevented from further traveling into the housing 42d due to engagement between the door 58d and the support member 56d. Therefore, engagement between the door 58d and the support member 56d prevents water from passing through the support member 56d and reaching the outlet duct 40 via the inlet 48 of the housing 42d. As described above with respect to the duct assembly 10, any water that remains in the housing 42d will exit the housing 42d via the check valves 46 disposed at various locations of the housing 42d.

Figure 7:
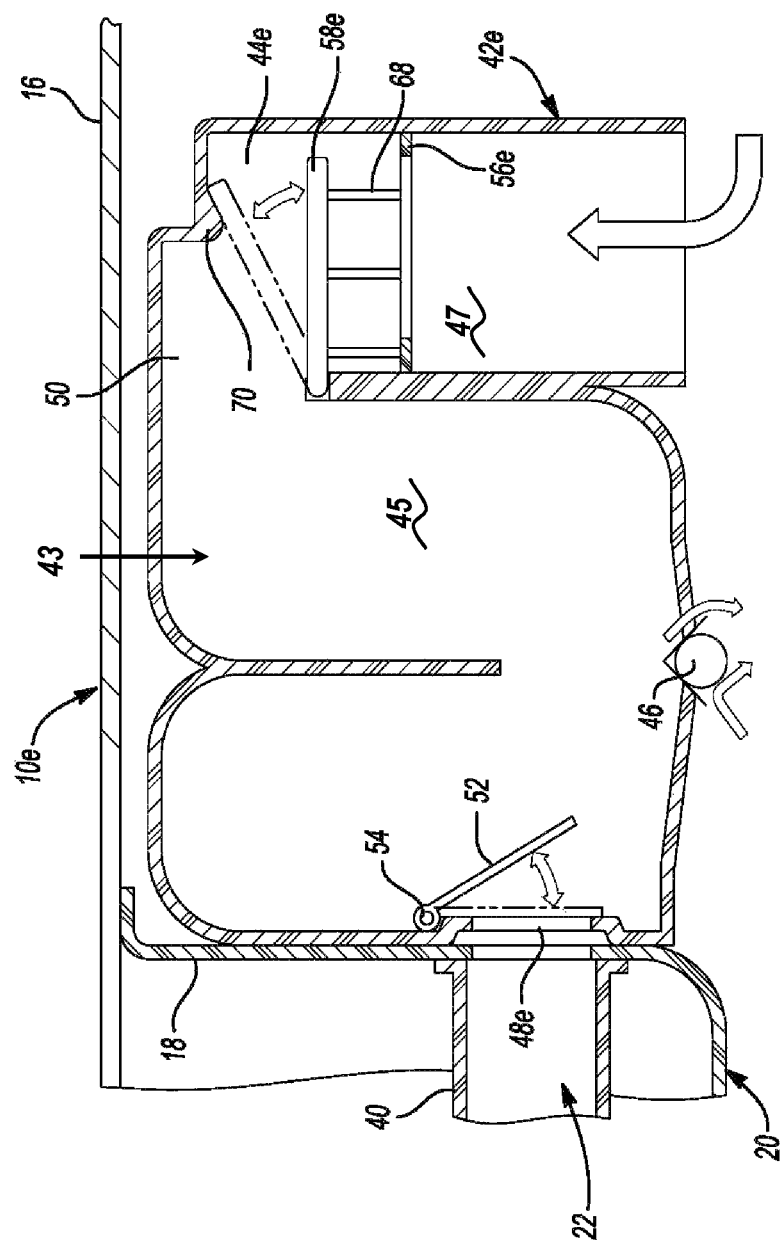
FIG. 7 is a cross-sectional view of a submergible duct in accordance with the principles of the present teachings incorporating a buoyant closure member.

With particular reference to FIG. 7, a duct assembly 10e is provided. In view of the substantial similarity in structure and function of the components associated with the duct assembly 10 with respect to the duct assembly 10e, like reference numerals are used hereinafter and in the drawings to identify like components while like reference numerals containing letter extensions are used to identify those components that have been modified.

The duct assembly 10e includes a housing 42e, a closure member 44e, and a check valve 46. The closure member 44e is positioned generally between an inlet 48 of the housing 42e and an outlet 50 of the housing 42e.

The closure member 44e includes and is supported by a series of posts 68 attached to the support member 56e. The posts 68 may be intricately formed with the support member 56e and extend generally away from the support member 56e and from the outlet 50 of the housing 42e. When the door 58e is in an open position, the door 58e rests on the posts 68 and when the door is in a closed position, the door 58e is disengaged from the posts 68. As with the duct assembly 10, the door 58e is formed from a buoyant material to allow the door 58e to be moved between the open position and the closed position when the housing 42e is submerged in a predetermined volume of water.

In operation, air from the outlet duct 40 is received by the housing 42e via the inlet 48 and door 52. The air is permitted to travel through the housing 42e and around the door 58e of the closure member 44e. Because the closure member 44e is supported by the series of posts 68, air flowing around the door 58e is permitted to travel around the posts 68 and pass through the support member 56e prior to exiting the housing 42e via the outlet 50. Similarly, when air is received at the outlet 50 of the housing 42e, air travels through the support member 56 and around the posts 68 prior to traveling around the door 58e. While the air is permitted to travel through the support member 56, and around the door 58e, the air is restricted from entering the outlet duct 40 due to engagement between 52 and the inlet 48 of the housing 42e.

When the duct assembly 10e is submerged in a predetermined volume of water, water enters the housing 42e generally at the outlet 50. When a sufficient volume of water enters the housing 42e, the water travels through the support member 56e and around the posts 68. The water engages the door 58e, thereby causing the door 58e to rotate in a counterclockwise direction relative to the view shown in FIG. 7 and move off of the posts 68. The door 58e continues to move in the counterclockwise direction relative to the view shown in FIG. 7 prior to engaging a stop 70 formed in the housing 42e. Engagement between the door 58e and the stop 70 of the housing 42e restricts further rotation of the door 58e relative to the housing 42e. When the door 58e is engaged with the stop 70 of the housing 42e, water is restricted from traveling through the door 58e and further into the housing 42e. Therefore, the engagement between a door 58e and the stop 70 of the housing 42e prevents the incoming water from entering the outlet duct 40 via the inlet 48 of the housing 42e. The door 58e may be hinged at one end to facilitate movement of the door 58e relevant to the housing 42e.

As with the duct assembly 10, any water that passes through the door 58e during submersion of the duct assembly 10e or that enters the housing 42e during operation of the vehicle 12 in wet driving conditions (i.e., rain, snow, etc.), will drain from the housing 42e via the check valve 46.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle comprising:
   a floor pan defining at least one cavity;
   a heat exchanger disposed within the at least one cavity and having an outlet duct;
   a passageway directing air through the heat exchanger and toward a wall of the at least one cavity; and
   a duct assembly fixedly attached to the wall of the at least one cavity and extending outwardly therefrom, the duct assembly having a housing having a tortuous path extending from an inlet of the housing to an outlet of the housing, the outlet of the housing pointing upward opposing and spaced below a bottom surface of the vehicle and extending away from ground to direct air exiting the outlet in a direction toward said bottom surface of the vehicle and away from ground and directly into an open environment beneath the vehicle;
   the outlet duct coupled to the inlet of the housing;
   the duct assembly having a door disposed proximate to the inlet of the housing, the door configured to permit air flow from the outlet duct into the housing through the inlet of the hosing and to restrict air flow from the housing into the outlet duct;
   the tortuous path including an upwardly extending portion and a downwardly extending portion with the downwardly extending portion disposed between the outlet of the housing and the upwardly extending portion;
   the duct assembly including a buoyant closure member disposed in the downwardly extending portion of the tortuous path, the buoyant closure member movable between an open position permitting flow between the inlet and the outlet of the housing and a closed position preventing flow between the inlet and the outlet of the housing, the buoyant closure member normally in the open position and moving from the open position to the closed position in response to a predetermined volume of water entering the housing through the outlet of the housing.

2. The vehicle of claim 1, wherein the housing of the duct assembly includes at least one check valve disposed at a low point of the housing that is normally open and closes in response to fluid pressure applied to an exterior of the housing where the check valve is disposed.

3. The vehicle of claim 1, wherein the buoyant closure member includes a ball float.

4. The vehicle of claim 1 wherein the buoyant closure member includes a door movable between the open position of the buoyant closure member and the closed position of the buoyant closure member.

5. The vehicle of claim 1 wherein the door of the buoyant closure member is pivotable between the open and closed position.

6. The vehicle of claim 1 wherein the outlet of the housing is positioned substantially ninety degrees in relation to the inlet of the housing.

* * * * *